(12) United States Patent
Miyata et al.

(10) Patent No.: US 7,663,609 B2
(45) Date of Patent: Feb. 16, 2010

(54) TOUCH INPUT DEVICE

(75) Inventors: Masahiko Miyata, Aichi (JP);
Katsuhide Kumagai, Aichi (JP);
Hitoshi Kumon, Aichi-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 774 days.

(21) Appl. No.: 11/342,468

(22) Filed: Jan. 30, 2006

(65) Prior Publication Data
US 2006/0170660 A1 Aug. 3, 2006

(30) Foreign Application Priority Data
Jan. 31, 2005 (JP) ............... 2005-024329

(51) Int. Cl.
*G09G 5/00* (2006.01)
(52) U.S. Cl. ..................... 345/173; 178/18.01
(58) Field of Classification Search ........... 345/87–104, 345/173–179, 55, 50, 38, 182, 3.1, 12; 349/12, 349/56, 139; 178/18.01, 18.03–18.09
See application file for complete search history.

(56) References Cited

U.S. PATENT DOCUMENTS 4,290,052 A * 9/1981 Eichelberger et al. ......... 341/33
6,707,448 B1 * 3/2004 Kunimatsu et al. .......... 345/173

FOREIGN PATENT DOCUMENTS

| JP | 02-284316 A | 11/1990 |
| JP | 04-278627 A | 10/1992 |
| JP | 11-272423 A | 10/1999 |
| JP | 2000-284912 A | 10/2000 |
| JP | 2001-202192 A | 7/2001 |
| JP | 2001202192 | * 7/2001 |
| JP | 2001-325072 A | 11/2001 |
| JP | 2004-227233 A | 8/2004 |
| JP | 2004-227234 A | 8/2004 |

* cited by examiner

*Primary Examiner*—Regina Liang
(74) *Attorney, Agent, or Firm*—Crompton, Seager & Tufte, LLC

(57) ABSTRACT

A touch input device for use with a display that shows a plurality of items. The touch input device is operated by a user to select an item shown on the display. The touch input device includes a sensor having an operation plane for touching by the user with a finger. The sensor generates a sensor signal indicating contact area of the finger with the operation plane. The operation plane is pressed by the finger when the user selects an item from the display. When an increase rate of the finger contact area over a predetermined time period becomes greater than an increase rate threshold, the touch input device determines that the operation plane of the sensor has been pressed by the user to select an item.

11 Claims, 4 Drawing Sheets

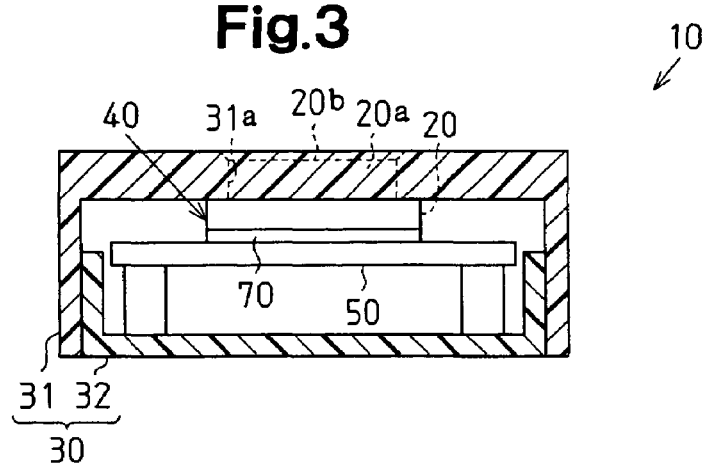
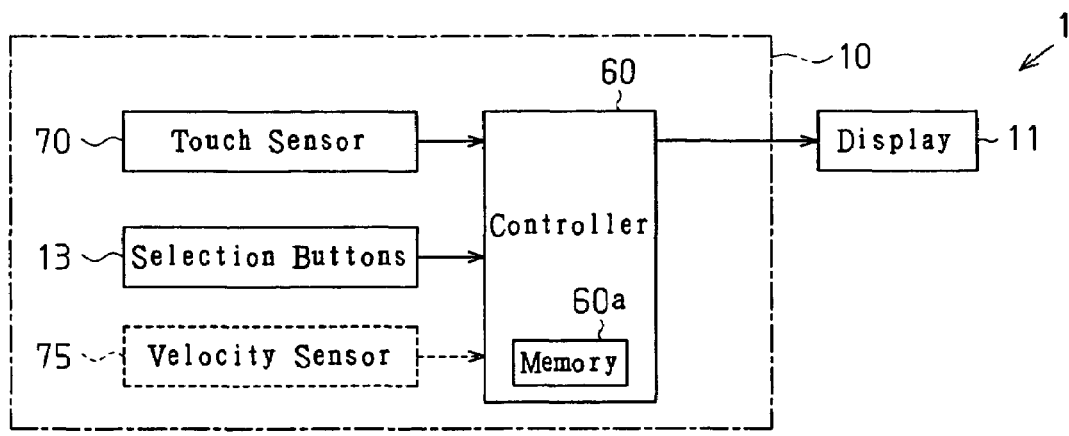
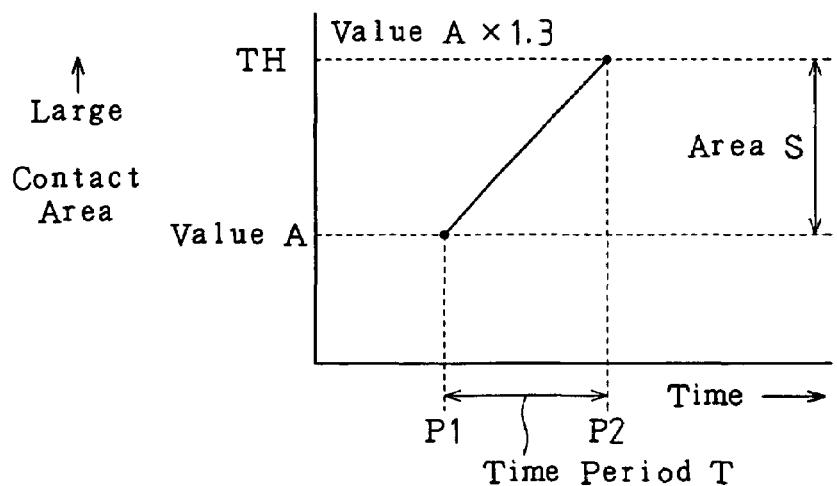

TOUCH INPUT DEVICE

BACKGROUND OF THE INVENTION

The present invention relates to a touch input device.

In the prior art, a display system including a touch input device and a display has been proposed (e.g., Japanese Laid-Open Patent Publication No. 2001-325072). The display system may be used in, for example, a vehicle. In such a display system, the touch input device is arranged where it can easily be operated such as on the center console. The display is arranged where it can easily be viewed such as on a center cluster panel. A user touches an operation plane of the touch input device to select one of a plurality of function items shown on a display. This enables the desired screen to be shown on the display or the corresponding vehicle equipment to be operated.

There are two types of touch operations performed by a user when touching such a touch input device. One is a trace operation in which the user traces the operation plane of the touch input device. That is, the user moves his or her finger along the operation plane to reach a desired function item shown on the display. Another is a selection operation in which the user presses the operation plane to select a function item. The user performs the trace operation to locate the desired function item shown on the display. Then, the user performs the selection operation to select that function item.

FIG. 7 shows the structure of a typical touch input device 100 that undergoes such trace and touch operations. The touch input device 100 includes an operation plane 101, a pivotal member 102, and a tactile switch 103. The pivotal member 102 is pivotal about fulcrum O when the operation plane 101 is pressed. In other words, the touch input device 100 has a hinged mechanism. When the user presses the operation plane 101 to perform a selection operation, the pivotal member 102 is pivoted to the state shown by broken lines in FIG. 7 so as to activate the tactile switch 103. This selects a function item shown on the display. In the touch input device 100, the hinged mechanism prevents the operation plane from swaying when the trace operation and selection operation are performed. This improves the feel of the operation plane 101 when the operation plane 101 is touched.

There is now a demand for smaller touch input devices. However, the touch input device 100 of the prior art employs the hinged mechanism to enable the selection operation. Therefore, the structure of the touch input device 100 is complicated and causes miniaturization to be difficult. Especially because of the pivoting of the pivotal member 102, space is required in a direction orthogonal to the operation plane 101. This hinders miniaturization of the touch input device 100. Accordingly, there is a demand for a touch input device having a simplified structure that can be miniaturized.

SUMMARY OF THE INVENTION

The present invention provides a touch input device having a simplified structure enabling miniaturization.

One aspect of the present invention is a touch input device for operation by a user to select an item from a plurality of items shown on a display. The touch input device includes a sensor having an operation plane for touching by the user with a finger. When touched, the sensor generates a sensor signal indicating contact area of the finger with the operation plane, and the operation plane is pressed by the finger when the user selects an item from the display. A controller is connected to the sensor. The controller obtains the finger contact area from the sensor signal, calculates an increase rate of the finger contact area over a predetermined time period, compares the finger contact area increase rate with a predetermined increase rate threshold, and determines that the operation plane of the sensor has been pressed by the user to select an item when the finger contact area increase rate is greater than the increase rate threshold.

Another aspect of the present invention is a display system for use in a vehicle. The display system includes a display for showing a plurality of items. A touch input device is connected to the display and operable by a user to select an item shown on the display. The touch input device includes a sensor having an operation plane for touching by the user with a finger. When touched, the sensor generates a sensor signal indicating contact area of the finger with the operation plane. The operation plane is pressed by the finger when the user selects an item from the display. A controller is connected to the sensor. The controller obtains the finger contact area from the sensor signal, calculates an increase rate of the finger contact area over a predetermined time period, compares the finger contact area increase rate with a predetermined increase rate threshold, and determines that the operation plane of the sensor has been pressed by the user to select an item when the finger contact area increase rate is greater than the increase rate threshold.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a cross-sectional view taken alone line 3-3 in FIG. 2,

FIG. 4 is a schematic block diagram showing the electric structure of the display system;

FIG. 5 is a graph showing an increase rate threshold;

DETAILED DESCRIPTION OF THE PREFERRED EMBODIMENTS

A touch input device, which is used in a display system 1 for vehicles, according to a preferred embodiment of the present invention will now be discussed with reference to FIGS. 1 to 6. The display device is used to operate various types of vehicle equipment, such as an air conditioner, an audio system, and a navigation system.

Figure 1:
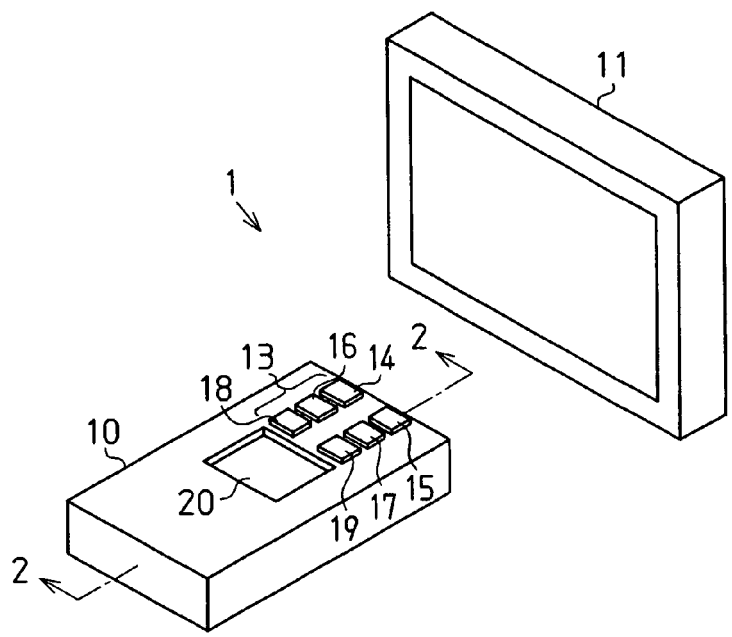
FIG. 1 is a schematic perspective view showing a display system according to the present invention.

As shown in FIG. 1, the display system 1 includes a touch tracer 10, which functions as a touch input device, and a display 11. The display 11 is arranged where it can be easily viewed by a user, such as a driver or passenger. For example, the display 11 may be located in the middle of a center cluster panel. In accordance with input information sent from the touch tracer 10, the display 11 shows, for example, the operation status of the air conditioner and audio system or maps for the navigation system. The touch tracer 10 is arranged where it can easily be operated. For example, the touch tracer 10 may be arranged in the center console.

The touch tracer 10 includes selection buttons 13 and an operation panel 20. In the preferred embodiment, the selection buttons 13, which are ordinary push buttons, include a present location button 15, a menu button 16, an air conditioner button 17, an audio system button 18, and a search button 19. The buttons 14 to 19 are pushed to show some or all of the associated function items on the display 11. For example, when the air conditioner button 17 is pushed, function items, such as a fan speed setting icon or a temperature setting icon, are shown on the display 11. The number of function items associated with each of the buttons 14 to 19 is predetermined.

Figure 2:
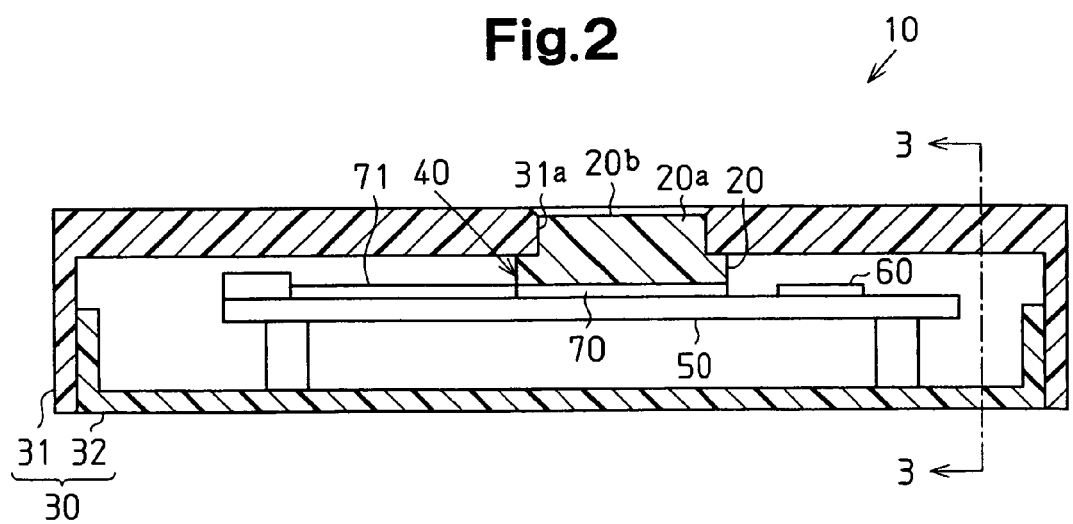
FIG. 2 is a cross-sectional diagram of a touch tracer taken along line 2-2 in FIG. 1.

Referring to FIGS. 2 and 3, the touch tracer 10 includes a case 30. The case 30 includes a sensor 40 and a circuit board 50. A controller 60 is arranged on the circuit board 50.

The case 30 is formed by a cover 31 and a base 32. The cover 31 is box-shaped and has an open bottom. The base 32 is also box-shaped and has an open top. The base 32 is fitted into the cover 31. A rectangular receptacle 31a extends through an upper surface of the cover 31, as viewed in FIG. 2.

The operation panel 20 is fixed to a sensing element 70 to form the sensor 40. The operation panel 20 includes a projection 20a shaped and sized in accordance with the receptacle 31a. The sensing element 70 is connected to the circuit board 50 by a harness 71. The sensor 40 is fixed to the cover 31 in a state in which the projection 20a of the operation panel 20 is inserted through the receptacle 31a so that an operation plane 20b of the operation panel 20 is exposed from the receptacle 31a. Therefore, the operation plane 20b is fixed relative to the cover 31. When the sensor 40 is fixed to the cover 31, there are no gaps between the receptacle 31a and the projection 20a of the operation panel 20. Instead of fixing the sensor 40 to the cover 31, the sensor 40 may be fixed to the circuit board 50.

The electronic structure of the display system 1 will now be described with reference to FIGS. 4 and 5.

Referring to FIG. 4, the touch tracer 10 and the display 11 are electrically connected to each other. The selection buttons 13 and the sensing element 70 are each connected to the controller 60.

The sensing element 70 is configured by a capacitance sensor. When a user touches the operation plane 20b with his or her finger, the sensing element 70 generates a sensor signal, which is sent to the controller 60. The sensor signal indicates the area of contact and location of contact between the user's finger and the operation plane 20b.

The controller 60 includes a central processing unit (CPU) and a memory 60a. The memory 60a stores an increase rate threshold InTH, which is used to determine whether the user has pressed the operation plane 20b to perform the selection operation. The increase rate threshold InTH is a threshold of the increase rate of the area of contact between the user's finger and the operation plane 20b (i.e., finger contact area) during a predetermined period (e.g., 500 milliseconds). Referring to FIG. 5, the increased amount of the area of contact (area A) between the user's finger and the operation plane 20b (i.e., finger contact area) between time point P1 to time point P2 is divided by the time period T elapsed between time point P1 and time point P2 to obtain the increase rate of the finger contact area. In the preferred embodiment, experiments were conducted with a number of subjects who performed the selection operation to set the increase rate threshold InTH based on statistics. Through the experiments, the time required by each subject to perform the selection operation and the finger contact area of each subject were checked. The experiment results were used to calculate the average increase rate of the finger contact area per predetermined time. The increase rate threshold is set at a value that is slightly smaller than the average increase rate.

The controller 60 samples the sensor signal, which is received from the sensing element, in cycles of a predetermined time, for example, several milliseconds. Further, the controller 60 sequentially stores the finger contact area that is obtained from the sensor signal in the memory 60a even when the finger is not in contact with the operation plane 20b. The controller 60 then obtains the average (i.e., measurement value A) of the finger contact areas stored in the memory 60a and monitors changes in the average value A.

When the increase rate of the measurement value A is less than the increase rate threshold, the controller 60 determines that the trace operation is being performed on the operation plane 20b. During the trace operation, the controller 60 performs movement between selection items shown on the display 11 in accordance with the location of contact between the user's finger and the operation plane 20b (i.e., finger contact location).

When the measurement value A starts to increase at a certain inclination, the controller 60 performs a predetermined calculation with the measurement value A obtained just before the measurement value A started to increase. This obtains a contact area threshold TH, which is also used by the controller 60 to determine whether or not the user is pressing the operation plane 20b and performing the selection operation. Referring to FIG. 5, in the preferred embodiment, the contact area threshold TH is set in correspondence with a value obtained by increasing the average value of the finger contact area by 30%. In other words, the contact area threshold TH is obtained by multiplying the measurement value A by a predetermined coefficient, which is 1.3 in this embodiment (measurement value A×1.3).

When the increased amount of the measurement value A per unit time is greater than the increase rate threshold and, at the same time, the measurement value A is greater than the contact area value TH, the controller 60 determines that the operation plane 20b has been pressed. In other words, even if the finger contact area on the operation plane 20b changes at a rate that is greater than the increase rate threshold InTH, the controller 60 does not determine that the selection operation has been performed on the operation plane 20b unless the finger contact area is greater than the contract area threshold TH. In this manner, the controller 60 uses two thresholds, the increase rate threshold InTH and the contact area threshold TH, to determine whether the user is pressing the operation plane 20b to perform the selection operation.

When determining that the selection operation has been performed, the controller 60 determines that the user has selected the function item shown on the display 11 that corresponds to the finger contact location determined from the present sensor signal. Then, the controller 60 operates the equipment corresponding to the selected function item.

The operation of the touch tracer 10 will now be described with reference to FIG. 6. An example in which a user who strongly presses the operation plane 20b (strong-pressing user), and an example in which a user who gently presses the operation plane 20b (gentle-pressing user) will now be described.

[Operation by Strong-Pressing User]

Figure 6:
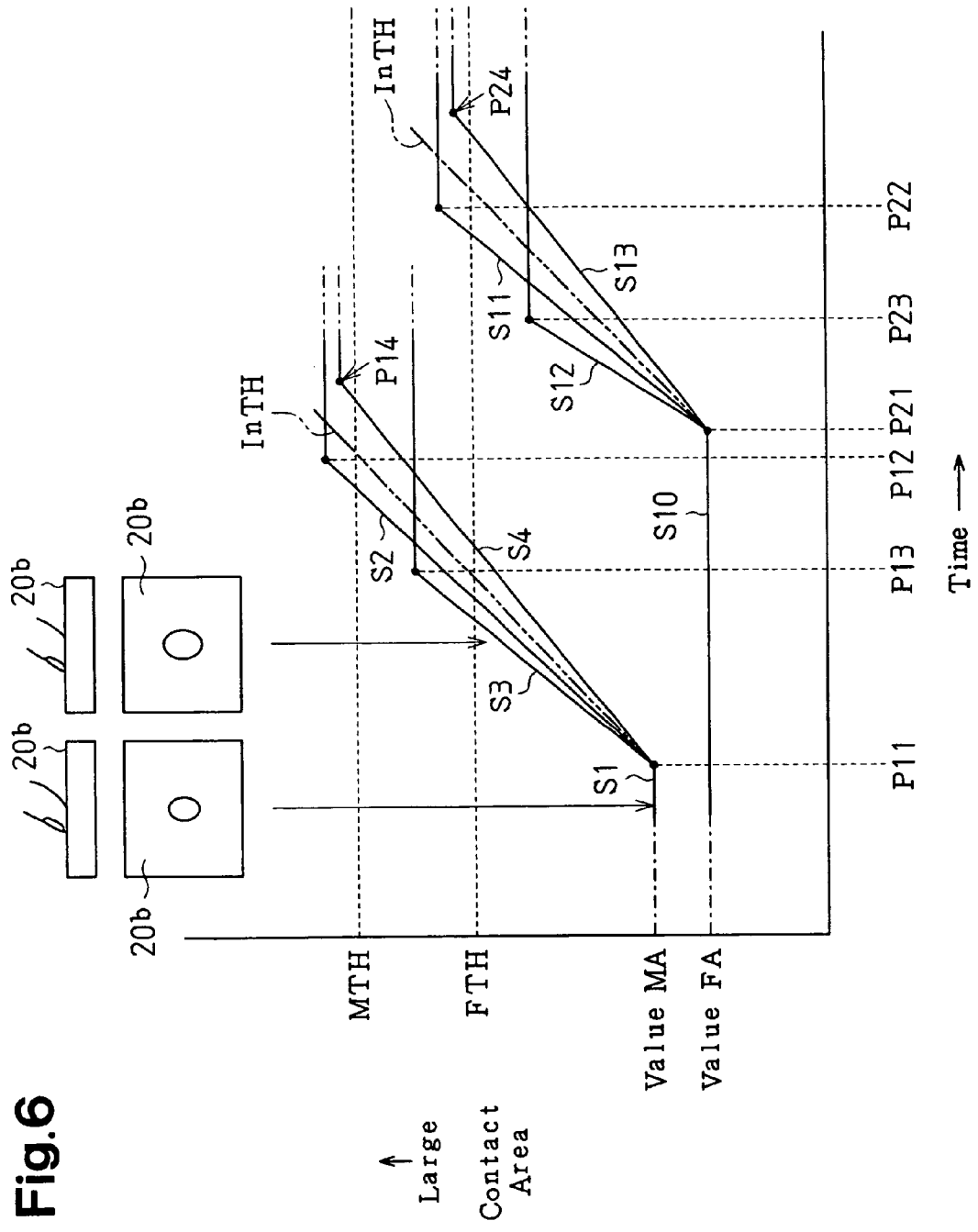
FIG. 6 is a graph showing changes in the average area of contact between a finger and an operation plane of the touch tracer.
Figure 7:
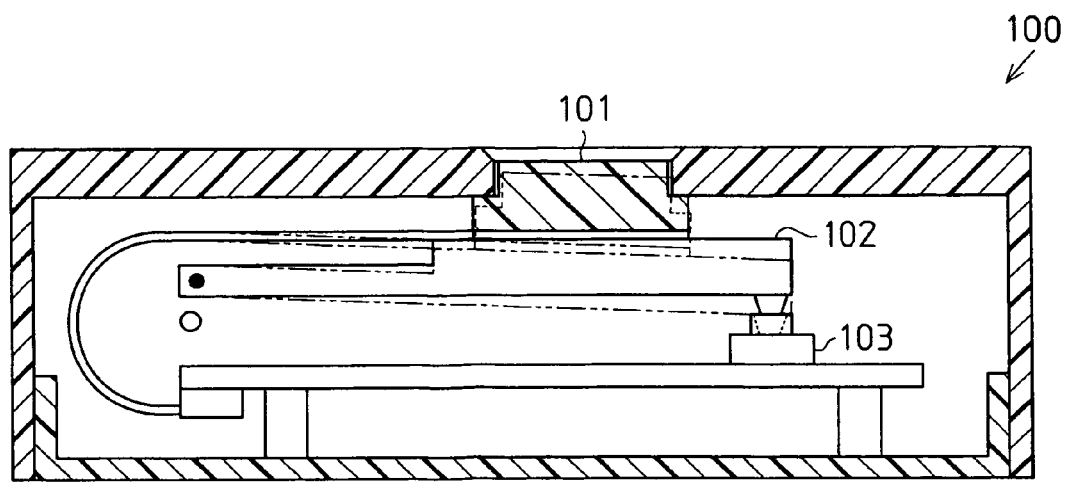
FIG. 7 is a cross-sectional diagram of a touch input device in the prior art.

When a strong-pressing user performs the trace operation on the operation plane 20b of the touch tracer 10, a measurement value MA is plotted as shown by line S1 in FIG. 6. The increase rate of the measurement value MA is less than the increase rate threshold InTH. Accordingly, the touch tracer 10 determines that the trace operation is being performed on the operation plane 20b. Thus, the touch tracer 10 performs movement between function items shown on the display 11 in accordance with the finger contact location on the operation plane 20b.

When the operation plane 20b is pressed at time point P11, an increase in the finger contact area on the operation plane 20b increases the measurement value MA. At the same time, the touch tracer 10 calculates a contact area threshold MTH from the measurement value MA taken at time point P11. Subsequently, if the measurement value MA increases until time point P12 as indicated by line S2 in FIG. 6, the increase rate of the measurement value MA is greater than the increase rate threshold InTH, which corresponds to the inclined broken line. Further, the measurement value MA is greater then the contact area threshold MTH. Accordingly, the touch tracer 10 determines that the selection operation has been performed on the operation plane 20b. Thus, the touch tracer 10 operates the equipment corresponding to the selected function item.

If the measurement value MA increases from time point P11 as indicated by line S3 until time point P13 and then becomes constant, the increase rate of the measurement value MA is greater than the increase rate threshold InTH. However, the measurement value MA at time point P13 is still less than the contact area threshold MTH. Accordingly, the touch tracer 10 determines that the user has not performed the selection operation and determines that the trace operation is still being performed. If the measurement value MA increases from time point P11 as indicated by line S4 until time point P14 and then becomes constant, the measurement value MA at time point P13 is greater than the contact area threshold MTH. However, the increase rate of the measurement value MA is less than the increase rate threshold InTH. Accordingly, the touch tracer 10 determines that the user has not performed the selection operation. The touch tracer 10 determines that the selection operation has been performed on the operation plane 20b only when the increase rate of the measurement value MA is greater than the increase rate threshold InTH and, at the same time, the measurement value MA is greater than the contact area value MTH.

[Operation by Gentle-Pressing User]

When a gentle-pressing user performs the trace operation on the operation plane 20b, a measurement value FA that is smaller than the measurement value MA is obtained. If the measurement value FA is plotted as shown by line S10 in FIG. 6, the increase rate of the measurement value FA is less than the increase rate threshold InTH. Accordingly, in the same manner as when the strong-pressing user touches the operation plane 20b, the touch tracer 10 determines that the trace operation is being performed on the operation plane 20b. Thus, the touch tracer 10 performs movement between function items shown on the display 11 in accordance with the finger contact location on the operation plane 20b.

When the operation plane 20b is pressed at time point P21, an increase in the finger contact area on the operation plane 20b increases the measurement value FA. At the same time, the touch tracer 10 calculates a contact area threshold FTH from the measurement value FA taken at time point P21. The contact area threshold FTH for the gentle-pressing user is smaller than the contact area value MTH for the strong-pressing user.

Subsequently, if the measurement value FA increases until time point P22 as indicated by line S11 in FIG. 6, the increase rate of the measurement value FA is greater than the increase rate threshold InTH, which corresponds to the inclined broken line. Further, the measurement value FA is greater then the contact area threshold FTH. Accordingly, the touch tracer 10 determines that the selection operation has been performed on the operation plane 20b. Thus, the touch tracer 10 operates the equipment corresponding to the selected function item.

If the measurement value FA increases from time point P21 as indicated by line S12 until time point P23 and then becomes constant, the increase rate of the measurement value FA is greater than the increase rate threshold InTH. However, the measurement value FA at time point P23 is still less than the contact area threshold FTH. Accordingly, the touch tracer 10 determines that the user has not performed the selection operation and determines that the trace operation is still being performed. If the measurement value FA increases from time point P21 as indicated by line S13 until time point P24 and then becomes constant, the measurement value FA at time point P24 would be greater than the contact area threshold FTH. However, the increase rate of the measurement value FA would be less than the increase rate threshold InTH. Accordingly, the touch tracer 10 determines that the user has not performed the selection operation. In this manner, even when the touch tracer 10 is operated by a user who gently presses the operation plane 20b, the touch tracer 10 determines that the selection operation has been performed on the operation plane 20b only when the increase rate of the measurement value FA is greater than the increase rate threshold InTH and, at the same time, the measurement value FA is greater than the contact area value FTH.

The touch tracer 10 obtains a different contact area threshold TH for different users to determine whether the selection operation has been performed. In the two examples described above, the touch tracer 10 obtains the contact area threshold MTH for a strong-pressing user and the contact area threshold FTH for a gentle-pressing user. In comparison with when there is only one contact area threshold TH, which would be obtained under the assumption that it is the optimal value for an average person, the contact area threshold TH used by the touch tracer 10 of this embodiment is more suitable for any user. Therefore, the touch tracer 10 is optimal for use to ensure determination of the selection operation regardless of whether the user presses the operation plane 20b strongly or gently.

The preferred embodiment has the advantages described below.

(1) If the increase rate of the measurement value A is greater than the increase rate threshold InTH, the controller 60 determines that the selection operation has been performed on the operation plane 20b. If the increase rate of the measurement value A is less than or equal to the increase rate threshold InTH, the controller 60 determines that the trace operation has been performed on the operation plane 20b. Accordingly, the controller 60 distinguishes the trace operation from the selection operation based on the increase rate of the finger contact area. The controller 60 obtains the increase rate of the finger contact area from the sensor signal of the sensing element 70. Accordingly, there is no need for a hinge mechanism or a mechanical component such as a tactile switch like in the prior art. This simplifies the structure of the touch tracer 10 and enables miniaturization of the touch tracer 10.

(2) The controller 60 determines that the selection operation has been performed on the operation plane 20b only when the increase rate of the measurement value A, which is the average finger contact area on the operation plane 20b, is greater than the increase rate threshold InTH, and, at the same time, the measurement value A is greater than the contact area threshold TH. In other words, the controller 60 determines that the selection operation has not been performed as long as the finger contact area does not exceed the contact area threshold TH even if the finger contact area is greater than the increase rate threshold InTH. Therefore, for example, when the user unintentionally presses the operation plane 20b due to vibrations or the like and thereby causes the increase rate of the finger contact area on the operation plane 20b to become greater than the increase rate threshold InTH, the controller 60 does not determine that the selection operation has been performed as long as the finger contact area remains less than the contact area threshold TH. Accordingly, the touch tracer 10 ensures that the selection operation is detected in accordance with the user's intentions.

(3) When the trace operation is being performed, the controller 60 obtains the measurement value A, which is the average of the finger contact area, and varies the contact area threshold TH in accordance with the measurement value A. The measurement value A differs between users. For example, there may be a user having a habit of strongly pressing the operation plane 20b. However, the controller 60 varies the contact area threshold TH in accordance with the measurement value A. Thus, the controller 60 uses a contact area threshold TH that is suitable for each user to determine whether the selection operation has been performed. This ensures that the touch tracer 10 detects the selection operation regardless of the user.

(4) The sensing element 70 is fixed relative to the cover 31 of the case 30. This enables the user to perform the selection operation with the same feel regardless of which part of the operation plane 20b he or she touches.

In the prior art touch input device, which uses a hinge mechanism, the force required to press the operation plane by the same amount depends on which part of the operation plane is touched, or how far the touched part is from the fulcrum of the hinge mechanism. This results in an awkward feel when touching the operation plane. Further, this problem becomes further noticeable as the operation plane becomes larger. However, the present invention solves such a problem.

(5) The sensor 40 is fixed to the cover 31 of the case 30 so that there are no gaps between the receptacle 31a and the projection 20a of the operation panel 20. This prevents dust and the like from entering the touch tracer 10. Further, there is no need for a waterproof structure to be provided between the receptacle 31a and the operation panel 20. This further simplifies the structure of the touch tracer 10. It is to be noted that a gap between the receptacle 31a and the operation panel 20 would be necessary in the touch input device of the prior art due to the hinge mechanism.

It should be apparent to those skilled in the art that the present invention may be embodied in many other specific forms without departing from the spirit or scope of the invention. Particularly, it should be understood that the present invention may be embodied in the following forms.

In the preferred embodiment, the contact area threshold TH is varied in accordance measurement value, which is the average finger contact area on the operation plane 20b. However, the contact area threshold TH may be stored in the memory 60a as a fixed value, which is determined based on, for example, evaluations given by a number of people. In this case, the controller 60 uses the contact area threshold TH and the increase rate threshold InTH, which are stored in the memory 60a, to determine whether or not the selection operation has been performed.

In the preferred embodiment, the memory 60a of the controller 60 stores a single increase rate threshold InTH. Thus, the controller 60 uses the same increase rate threshold InTH regardless of the user. However, a plurality of increase rate thresholds may be stored in the memory 60a of the controller 60 in accordance with the measurement value A. In this case, the controller 60 selects the increase rate threshold in accordance with the measurement value A. That is, the controller 60 selects the inclination rate threshold that is suitable for each user. Then, the controller 60 uses the selected inclination rate threshold with the contact rate threshold TH to determine whether the selection operation has been performed. For example, the touch tracer 10 may enter a mode for setting the operation feel of the operation plane 20b (setting mode), and as the measurement value A changes, the touch tracer 10 may select the increase rate threshold that is closest to the change rate of the measurement value A. Then, the controller 60 uses the selected increase rate threshold to determine whether the user has performed the trace operation or the selection operation. In such a case, the user may operate, for example, a selection button 13, to enter the setting mode and then actually perform the selection operation on the operation plane 20b to have the suitable increase rate threshold selected for the user. This would enable the user to operate the touch tracer 10 with the optimal feel.

The touch tracer 10 of the preferred embodiment may include a detector that detects the travel state of the vehicle. For example, as shown by the broken lines in FIG. 4, the touch tracer 10 may include a vehicle velocity sensor 75 that generates a detection signal in accordance with the velocity of the vehicle. In such a case, when determining with the velocity sensor 75 that the vehicle is traveling, the controller 60 may suspend determination of the selection operation even if the increase rate of the average value A is greater than the increase rate threshold InTH and the measurement value A is greater than the contact area threshold TH. In other words, the controller 60 may invalidate the selection operation when determining that the vehicle is traveling. This prevents erroneous detections of the selection operation that may be caused due to vibrations when the vehicle is traveling. As a result, determination of whether the user has performed the selection operation would become further accurate.

Further, the controller 60 may vary the increase rate threshold InTH or the contact area threshold TH in accordance with the velocity detected by the velocity sensor 75. For example, if the vehicle velocity is high, the controller 60 may slightly increase the contact area threshold TH. Vibrations of a vehicle normally increase as the vehicle velocity becomes high. Thus, it may be presumed that a user would press the operation plane 20b with a stronger force as the vehicle velocity increases. As a result, the operation feel of the touch tracer 10 differs between when the vehicle is traveling and when the vehicle is not traveling. Accordingly, by varying the contact area threshold TH in accordance with the vehicle velocity, the user may operate the operation plane 20b with the same feel when the vehicle is traveling and when the vehicle is not traveling.

In the preferred embodiment, the controller 60 may determine whether or not the selection operation has been performed based on only whether the increase rate of the measurement value A is greater than the increase rate threshold InTH. This would also simplify the structure of the touch tracer 10 and enable miniaturization of the touch tracer 10.

The sensing element 70 does not necessarily have to be a capacitance sensor. For example, the sensing element 70 may be formed by pressure sensors arranged in a grid-like manner under the operation plane 20b. As long as the sensing element 70 is capable of detecting the contact location and contact area of a finger on the operation plane 20b, the sensor employed as the sensing element 70 may have any structure or use any principle.

The application of the present invention is not limited to a touch tracer 10 installed in vehicles. For example, the present invention may be applied to a remote control for a car navigation system.

The present examples and embodiments are to be considered as illustrative and not restrictive, and the invention is not to be limited to the details given herein, but may be modified within the scope and equivalence of the appended claims.

What is claimed is:

1. A touch input device for operation by a user to select an item from a plurality of items shown on a display, the touch input device comprising:
    a sensor having an operation plane for touching by the user with a finger, and when touched, the sensor generates a sensor signal indicating contact area of the finger with the operation plane, and the operation plane being pressed by the finger when the user selects an item from the display; and
    a controller connected to the sensor, the controller obtaining the finger contact area from the sensor signal, calculating an increase rate of the finger contact area over a predetermined time period, comparing the finger contact area increase rate with a predetermined increase rate threshold, comparing the finger contact area with a finger contact area threshold, and determining that the operation plane of the sensor has been pressed by the user to select an item when the finger contact area is greater than the finger contact area threshold in a state in which the finger contact area increase rate is greater than the increase rate threshold; and
    wherein the controller further samples the finger contact area during a predetermined time period to calculate an average finger contact area when the user is tracing the operation plane of the sensor with a finger, and the controller obtains the finger contact area threshold in accordance with the average finger contact area.

2. The touch input device according to claim 1, wherein the controller multiplies the average finger contact area by a predetermined coefficient to obtain the finger contact area threshold when the user is tracing the operation plane with a finger.

3. The touch input device according to claim 1, wherein the controller includes a memory for storing the increase rate threshold.

4. The touch input device according to claim 1, further comprising:
    a case for accommodating the sensor such that the operation plane of the sensor is exposed from the case, wherein the operation plane is fixed relative to the case.

5. The touch input device according to claim 1, wherein the touch input device is for use in a vehicle, the touch input device further comprising:
    a detector, connected to the controller, for generating a detection signal when the vehicle is traveling, the controller determining whether the vehicle is traveling based on the detection signal, wherein the controller refrains from determining that the operation plane of the sensor has been pressed when it has determined that the vehicle is traveling.

6. The touch input device according to claim 1, wherein the sensor includes a capacitance sensor for detecting capacitance when the user touches the operation plane to generate the sensor signal.

7. A display system for use in a vehicle, the display system comprising:
    a display for showing a plurality of items; and
    a touch input device connected to the display and operable by a user to select an item shown on the display, the touch input device including a sensor having an operation plane for touching by the user with a finger, and when touched, the sensor generates a sensor signal indicating contact area of the finger with the operation plane, the operation plane being pressed by the finger when the user selects an item from the display; and
    a controller connected to the sensor, the controller obtaining the finger contact area from the sensor signal, calculating an increase rate of the finger contact area over a predetermined time period, comparing the finger contact area increase rate with a predetermined increase rate threshold, comparing the finger contact area with a finger contact area threshold, and determining that the operation plane of the sensor has been pressed by the user to select an item when the finger contact area is greater than the finger contact area threshold in a state in which the finger contact area increase rate is greater than the increase rate threshold; and
    wherein the controller further samples the finger contact area during a predetermined time period to calculate an average finger contact area when the user is tracing the operation plane of the sensor with a finger and the controller obtains the finger contact area threshold in accordance with the average finger contact area.

8. The display system according to claim 7, wherein the controller multiplies the average finger contact area by a predetermined coefficient to obtain the finger contact area threshold when the user is tracing the operation plane with a finger.

9. The display system according to claim 7, further comprising:
    a case for accommodating the sensor such that the operation plane of the sensor is exposed from the case, wherein the operation plane is fixed relative to the case.

10. The display system according to claim 7, wherein the display system is for use in a vehicle, the display system further comprising:
    a detector, connected to the controller, for generating a detection signal when the vehicle is traveling, the controller determining whether the vehicle is traveling based on the detection signal, wherein the controller refrains from determining that the operation plane of the sensor has been pressed when it has determined that the vehicle is traveling.

11. The display system according to claim 7, wherein the sensor includes a capacitance sensor for detecting capacitance when the user touches the operation plane to generate the sensor signal.

* * * * *

UNITED STATES PATENT AND TRADEMARK OFFICE
CERTIFICATE OF CORRECTION

PATENT NO.        : 7,663,609 B2
APPLICATION NO.   : 11/342468
DATED             : February 16, 2010
INVENTOR(S)       : Masahiko Miyata et al.

It is certified that error appears in the above-identified patent and that said Letters Patent is hereby corrected as shown below:

Column 9
Line 21 Delete "linger" and insert therefor -- finger --.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO.       : 7,663,609 B2
APPLICATION NO.  : 11/342468
DATED            : February 16, 2010
INVENTOR(S)      : Masahiko Miyata et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 774 days.

should read (*) Notice: Subject to any disclaimer, the term of this patent is extended or adjusted under 35 U.S.C. 154(b) by 1,054 days.

Signed and Sealed this

Third Day of August, 2010

David J. Kappos
*Director of the United States Patent and Trademark Office*